C. T. HATCH.
FEEDING APPARATUS.
APPLICATION FILED MAY 8, 1907. RENEWED AUG. 31, 1908.

900,851. Patented Oct. 13, 1908.

Witnesses:—

Inventor
Charles T. Hatch
per
Risley & Love
Attorneys.

UNITED STATES PATENT OFFICE.

CHARLES T. HATCH, OF WATERVILLE, NEW YORK.

FEEDING APPARATUS.

No. 900,851.          Specification of Letters Patent.          Patented Oct. 13, 1908.

Application filed May 8, 1907, Serial No. 372,478. Renewed August 31, 1908. Serial No. 451,029.

*To all whom it may concern:*

Be it known that I, CHARLES T. HATCH, a citizen of the United States, residing at Waterville, in the county of Oneida and State of New York, have invented certain new and useful Improvements in Feeding Apparatus, of which the following is a specification, reference being had therein to the accompanying drawing.

My invention relates to an improved feeding apparatus and I declare that the following is a full, clear, concise and exact description thereof, sufficient to enable one skilled in the art to make and use the same.

Figure 1:
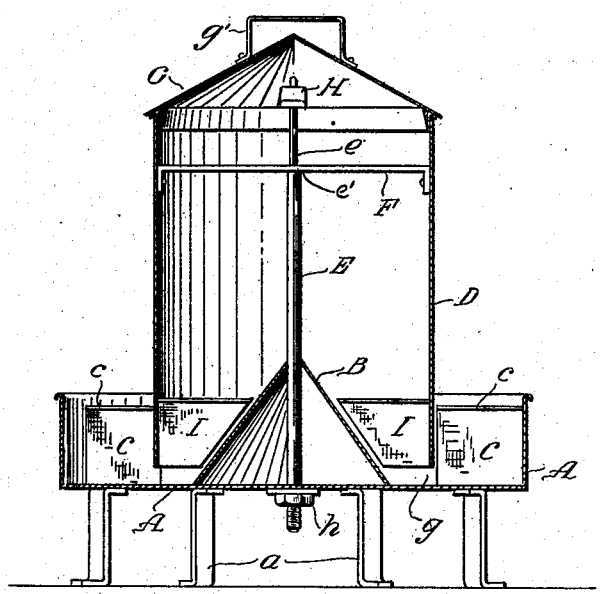
Figure 2:
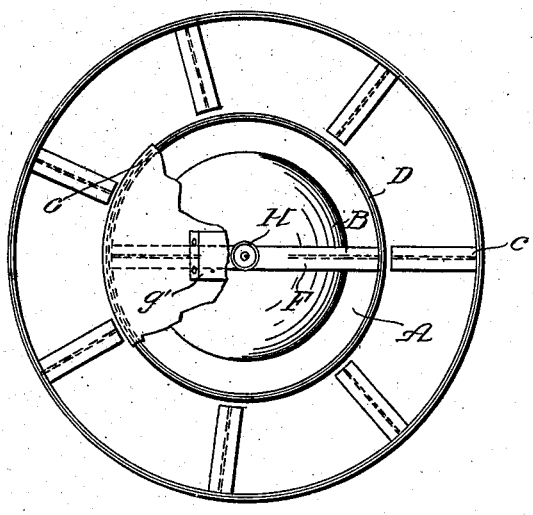

The device is one which is particularly designed for use in poultry yards and is illustrated in one form in the accompanying drawings in which Figure 1 is a cross section view and Fig. 2 is a top view.

A circular form of the device is preferable both for cleanliness and also for convenience of use for a larger number. It comprises means for insuring proper feeding of the contents and for adjustment of the parts for that purpose according to the character of the contents. From its construction, also, there is a minimum of waste, the grain or mash being supplied equally to a number of pockets so formed as to keep the fowls from scattering the feed.

Referring to the drawings in which like references refer to like parts, A is the basin or trough, shown as a circular pan supported by legs $a$, at a proper and convenient height. Rising from the center of the pan is a pyramidal or conical member B, which is here soldered to the base, the sides distributing the contents toward the outer edge of the pan to keep the supply of food in the pockets or troughs from which the fowls take it. These pockets or troughs are formed by radial partitions C, arranged around the basin on the inside and extending inward substantially to the walls of the food receptacle or hopper D and spaced to make the pockets of suitable size. The partitions are provided with horizontal top plates, $c$, which extend more or less on each side forming tops for the pockets and more effectively preventing the scattering of the food. Of course the size of these pockets or troughs is a matter of judgment, but I prefer them in about the proportions shown in the drawings.

Screwed in the bottom of the basin which is reinforced for that purpose and passing through the member B is a standard E on the end of which is mounted a bar $e$ the joint forming a shoulder $e'$. If preferred the rod and bar may be formed integral and the shoulder be formed thereon in any suitable manner.

D is a hopper, cylindrical as here shown, supported relative to the basin A by a strap F secured to the hopper and resting on the shoulder $e'$ so that the hopper can be revolved freely, its walls lying just within the partitions C and its bottom clearing the basin a suitable distance for the outlet of the contents. This distance may be altered by screwing or unscrewing the rod. For instance in case dry mash, grain or the like is fed the outlet (shown at $g$ Fig. 1) is much smaller than in case wet mash is fed when it should be raised enough for the fowl to pick out the food which settles in the bottom of the hopper. After such adjustment is made nut $h$ is tightened and the bar E thus held.

H is a cap on the bar which limits the extent to which the hopper can be lifted on the bar $e$ and which should be so placed and secured that the lower edge of the hopper can not be lifted above the walls C. The hopper may be occasionally lifted, and swung to and fro as required, to insure the settling of the contents to the outlet, especially in case a dry mash is fed. Secured in the inside of the hopper are blades, I, extending nearly to the walls of member B and which are of a size to dislodge any food that may tend to stick to such walls. A cover G is provided for the device with bail $g$.

Having described my invention what I claim as new and desire to secure by Letters Patent is, 1. In a device of the character described, a feed trough, a hopper located centrally thereto, the said hopper discharging feed to the trough, walls dividing the trough into a plurality of compartments, and plates supported on said walls and partially covering the compartments, substantially as shown.

2. In a device of the character described, a feed basin, a hopper centrally mounted thereon, a standard supporting the hopper and adjustably mounted vertically of the device and terminating in a bar, a cap on the bar, the said standard and the said cap being adapted to permit free revolution of the hopper on the standard and limit the lifting of the hopper, substantially as described.

3. In a device of the character described, a standard, a hopper axially mounted and revoluble thereon and provided with radial interior blades adapted on the revolution of the hopper to loosen the contents thereof.

4. In a device of the character described, a feed trough, a bar mounted within the confines of the trough, a hopper supported on the bar adjustable relative to the trough and revoluble on the bar and vertically movable thereon, blades radially mounted in the hopper and crossing the outlet from the hopper to the trough.

5. In a device of the character described, a circular trough, partitions dividing the same and having horizontally extended tops, a vertical bar, a hopper revolubly and slidably mounted on the bar and within the confines of the trough, a conical structure within the hopper adapted to assist the discharge of its contents and blades radially mounted in the hopper extending substantially to the conical structure across the line of discharge from the hopper to the trough, for the uses and purposes set forth.

In testimony whereof I affix my signature in presence of two witnesses.

CHARLES T. HATCH.

Witnesses:
    LOUIS P. FUESS,
    BRYANT G. LAWRENCE.